United States Patent [19]
Langer et al.

[11] Patent Number: 6,051,193
[45] Date of Patent: *Apr. 18, 2000

[54] MULTILAYER INTUMESCENT SHEET

[75] Inventors: Roger L. Langer, Hudson, Wis.; Stephen M. Sanocki, Stillwater; Gary F. Howorth, St. Paul, both of Minn.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/796,827

[22] Filed: Feb. 6, 1997

[51] Int. Cl.[7] .............................. F01N 3/10; B01D 53/34; B32B 5/00
[52] U.S. Cl. ........................ 422/179; 422/180; 422/221; 428/57; 428/77; 428/324; 428/327; 428/920
[58] Field of Search .................................. 422/179, 180, 422/221, 222; 428/77, 57, 213, 354, 913, 920, 921, 102, 324, 327, 91

[56] References Cited

U.S. PATENT DOCUMENTS

| | | | |
|---|---|---|---|
| 3,916,057 | 10/1975 | Hatch et al. | 428/236 |
| 4,048,363 | 9/1977 | Langer et al. | 428/920 |
| 4,271,228 | 6/1981 | Foster et al. | 428/920 |
| 4,285,909 | 8/1981 | Mizusawa et al. | 422/179 |
| 4,305,992 | 12/1981 | Langer et al. | 428/920 |
| 4,454,190 | 6/1984 | Katagiri | 428/913 |
| 4,495,030 | 1/1985 | Giglia | 428/903 |
| 4,499,134 | 2/1985 | Whitely et al. | 428/340 |
| 4,504,527 | 3/1985 | Hara et al. | 428/920 |
| 4,600,634 | 7/1986 | Langer | 428/220 |
| 4,612,087 | 9/1986 | Ten Eyck | 162/129 |
| 4,750,251 | 6/1988 | Motley et al. | 422/179 |
| 4,782,661 | 11/1988 | Motley et al. | 422/179 |
| 4,863,700 | 9/1989 | Ten Eyck | 422/179 |
| 4,865,818 | 9/1989 | Merry et al. | 422/179 |
| 4,879,170 | 11/1989 | Radwanski et al. | 428/233 |
| 4,929,429 | 5/1990 | Merry | 422/179 |
| 4,999,168 | 3/1991 | Ten Eyck | 422/179 |
| 5,032,441 | 7/1991 | Ten Eyck et al. | 428/921 |
| 5,094,780 | 3/1992 | von Bonin | 428/921 |
| 5,132,054 | 7/1992 | Stahl | 428/921 |
| 5,137,658 | 8/1992 | Stahl | 428/920 |
| 5,139,615 | 8/1992 | Conner et al. | 162/145 |
| 5,246,759 | 9/1993 | Keller | 428/285 |
| 5,254,410 | 10/1993 | Langer et al. | 428/402 |
| 5,258,216 | 11/1993 | von Bonin et al. | 428/313.9 |
| 5,332,609 | 7/1994 | Corn | 428/920 |
| 5,376,341 | 12/1994 | Gulati | 422/179 |
| 5,384,188 | 1/1995 | Lebold et al. | 428/921 |
| 5,385,873 | 1/1995 | MacNeill | 422/179 |
| 5,452,551 | 9/1995 | Charland et al. | 52/232 |
| 5,468,348 | 11/1995 | Blackledge et al. | 162/132 |
| 5,482,686 | 1/1996 | Lebold et al. | 422/179 |
| 5,523,059 | 6/1996 | Langer | 422/179 |
| 5,580,532 | 12/1996 | Robinson et al. | 422/179 |
| 5,615,711 | 4/1997 | Lewis | 138/149 |

FOREIGN PATENT DOCUMENTS

| | | |
|---|---|---|
| 0 319 299 | 6/1989 | European Pat. Off. . |
| 0 396 330 | 11/1990 | European Pat. Off. . |
| 0 429 246 | 5/1991 | European Pat. Off. . |
| 0 602 018 | 6/1994 | European Pat. Off. . |
| 0 639 702 | 2/1995 | European Pat. Off. . |
| WO 97/02218 | 1/1997 | WIPO . |
| WO 97/02219 | 1/1997 | WIPO . |
| WO 97/02412 | 1/1997 | WIPO . |
| WO 97/02413 | 1/1997 | WIPO . |
| WO 97/02414 | 1/1997 | WIPO . |

OTHER PUBLICATIONS

Tappi Journal, "Multi–ply Sheet Formation On Inclined–Wire Formers", Oct. 1988, pp. 155–158.
Patent Abstracts of Japan, vol. 008, No. 083 (M–290), Apr. 17, 1984 & JP 59 000519 A, Jan. 5, 1984 (abstract).
Umehara et al.: "Design Development of High Temperature Manifold Converter Using Thin Wall Ceramic Substrate", *Society of Automotive Engineers*, No. SAE971030, 1997, pp. 123–129.
Japanese Pat. Appln (translation) Publication No. J.P. Hei. 2–43786, Oct. 1990.

*Primary Examiner*—Hein Tran
*Attorney, Agent, or Firm*—Harold C. Knecht, III

[57] ABSTRACT

The invention provides a multilayer intumescent mat or sheet that is useful as a mounting for a pollution control device or as a firestop. In one aspect, the multilayer intumescent sheet of the invention includes a non-moldable flexible non-intumescent layer and a non-moldable flexible intumescent layer including an intumescent material wherein the layers form a single sheet without the use of auxiliary bonding means. In another aspect, the multilayer intumescent sheet of the invention includes a first non-moldable intumescent layer including a first intumescent material and a second non-moldable intumescent layer comprising a second intumescent material, the first and second intumescent materials being different, wherein the layers form a single sheet without the use of auxiliary bonding means. The invention also provides a pollution control device including a multilayer sheet of the invention disposed between a monolith and a housing.

21 Claims, No Drawings

MULTILAYER INTUMESCENT SHEET

FIELD OF THE INVENTION

This invention relates to flexible intumescent sheets useful as firestops or as mounting mats for catalytic converters and diesel particulate filters or traps and particularly to flexible multilayer intumescent sheets that have at least two layers that form a single sheet without auxiliary bonding materials.

BACKGROUND OF THE INVENTION

Pollution control devices are employed on motor vehicles to control atmospheric pollution. Such devices include catalytic converters and diesel particulate filters. Catalytic converters typically contain a ceramic monolithic structure which supports the catalyst. The monolithic structure may also be made of metal. Diesel particulate filters or traps are wall flow filters which have honeycombed monolithic structures typically made from porous crystalline ceramic materials.

Each of these devices has a metal housing (typically stainless steel) which holds a ceramic or steel monolithic structure. The ceramic monolithic structures generally have very thin walls to provide a large surface area for the catalyst and are fragile and susceptible to vibration damage and breakage. The ceramic monolithic structures or monoliths have a coefficient of thermal expansion generally an order of magnitude less than the metal housing which contains them. To avoid damage to the ceramic monoliths from road shock and vibrations, to compensate for the thermal expansion difference, and to prevent exhaust gases from passing between the monoliths and the metal housings, ceramic mats or paste materials are disposed between the ceramic monoliths and the metal housings. The process of placing or disposing of the mounting material or mat is also called canning and includes such processes as injecting a paste into a gap between the monolith and the metal housing, or wrapping a sheet or mat material around the monolith and inserting the wrapped monolith into the housing.

Typically, the paste or sheet mounting materials include inorganic binders, inorganic fibers, intumescent materials, organic binders, fillers and other adjuvants. The materials may be used as sheets, mats, or pastes. Known mat materials, pastes, and intumescent sheet materials used for mounting a monolith in a housing are described in, for example, U.S. Pat. Nos. 3,916,057 (Hatch et al.), 4,305,992 (Langer et al.), 4,385,135 (Langer et al.), 5,254,410 (Langer et al.), 5,242,871 (Hashimoto et al.), 3,001,571 (Hatch), 5,385,873 (MacNeil), 5,207,989 (MacNeil), and GB 1,522, 646 (Wood).

SUMMARY OF THE INVENTION

The invention provides a multilayer intumescent mat or sheet that is useful as a mounting for a catalytic converter element or a diesel particulate filter or as a firestop. In one aspect, the multilayer intumescent sheet of the invention comprises at least one non-moldable flexible non-intumescent layer and at least one non-moldable flexible intumescent layer comprising an intumescent material wherein the layers form a single sheet without the use of auxiliary bonding means. In another aspect, the multilayer intumescent sheet of the invention provides at least (a) a first non-moldable intumescent layer comprising a first intumescent material and (b) a second non-moldable intumescent layer comprising a second intumescent material, the first and second intumescent materials being different, wherein the layers form a single sheet without the use of auxiliary bonding means.

In another aspect, the invention provides a catalytic converter or a diesel particulate filter or pollution control device using a multilayer sheet of the invention. A pollution control device of the invention comprises a housing, a monolithic structure or pollution control element(s), and a multilayer intumescent sheet comprising (a) at least one non-moldable flexible non-intumescent layer; and (b) at least one non-moldable flexible intumescent layer comprising an intumescent material, said layers forming a single sheet without the use of auxiliary bonding means, said multilayer sheet being disposed between the structure and the housing to hold the structure in place.

In yet another aspect, the invention provides a pollution control device of the invention comprising a housing, a monolithic structure or element(s), and a multilayer intumescent sheet comprising at least (a) a first non-moldable flexible intumescent layer comprising a first intumescent material; and (b) a second non-moldable flexible intumescent layer comprising a second intumescent material, the first and second intumescent materials being different, said layers forming a single sheet without the use of auxiliary bonding means, said multilayer sheet being disposed between the structure and the housing to hold the structure in place.

In another aspect, the invention provides a flexible multilayer intumescent sheet useful as a firestop comprising at least (a) a non-moldable flexible non-intumescent layer comprising endothermic filler; and (b) a non-moldable flexible intumescent layer comprising an intumescent material, said layers forming a single sheet without the use of auxiliary bonding means.

In another aspect, the invention provides a process for making a multilayer intumescent sheet comprising the steps of (a) providing a first slurry and a second slurry, said first and second slurries comprising inorganic materials and at least one of the slurries contains an intumescent material; (b) depositing the first slurry onto a permeable substrate; (c) partially dewatering said first slurry to form a first layer; (d) depositing the second slurry onto said first layer; and (e) dewatering said second slurry to form a second layer, said layers forming a single sheet without auxiliary bonding means, wherein said process is a continuous process.

Known bonded multilayer mounting mats are typically made by first separately forming the layers and then bonding the layers together using an adhesive or a film or other means for example, stitches or staples. Typically, adhesively or film bonded multilayer mounting mats contain higher levels of organic material which produces undesirable smoke and odor when used in a catalytic converter. To prevent such smoke and odor, the mounting mats would have to be preheated before installation to burn off the organic bonding materials. Additionally, such mounting mats are more expensive to manufacture due to the cost of bonding the layers together and the cost of the adhesive or film used. Some disadvantages of mechanically bonded or attached multilayered mounting mats include the expense of added steps and materials and the mat may be weakened at the point of mechanical attachment such as where stitches or staples perforate the mat. Other multilayer mounting mats are comprised of separate layers that must be individually mounted within the catalytic converter housing.

A disadvantage of a single layer mat or sheet containing expandable graphite or a mixture of expandable graphite and unexpanded vermiculite is that typically, such single sheet constructions having a homogeneous or uniform composition throughout the sheet require relatively high amounts of expandable graphite for the desired low temperature expansion which increases the cost of the mat.

Some of the advantages of the present invention include, for example, that the flexible multilayer sheet: is made without adhesives or other auxiliary bonding means; can be formulated so to expand or intumesce over specific temperature ranges using relatively less intumescent material; can be made using a continuous process; is easier to handle and requires less labor to install than mats made from two or more individually bonded sheets; and requires less organic materials than adhesively bonded or laminated sheets because an adhesive is not required.

Additional features and advantages of the invention will be set forth in and will be apparent from the following description and examples.

DETAILED DESCRIPTION OF THE INVENTION

In general terms, the flexible multilayer sheet of the present invention is substantially inorganic and comprises at least two non-moldable flexible layers that form a single resilient sheet without auxiliary bonding means wherein at least one of the layers comprises an intumescent material. The layers are formed on top of one another to form a single sheet. One of the unique features of the intumescent sheets of the present invention is that the sheets, taken as a whole and particularly in cross-section, have a non-homogeneous composition. This feature results from forming a single sheet from at least two adjacent layers wherein each adjacent layer has a homogeneous, but distinct composition. In a preferred embodiment, a non-intumescent layer contains ceramic fibers, and an intumescent layer contains either unexpanded vermiculite, unexpanded treated vermiculite, or a mixture of both. In another preferred embodiment, a first intumescent layer contains intumescent graphite and a second intumescent layer contains either unexpanded vermiculite, unexpanded treated vermiculite, or a mixture of both. In another preferred embodiment, a first intumescent layer contains a mixture of expandable graphite and unexpanded vermiculite and a second intumescent layer contains either unexpanded vermiculite, unexpanded treated vermiculite, or a mixture of both.

Generally, each of the homogeneous layers of the multilayer sheets of the invention can comprise from 0.3 to 99.7 dry weight percent of the entire multilayer sheet. Preferably, each of the layers comprise from 1.5 to 98.5 dry weight percent, more preferably, from 8 to 92 dry weight percent, and even more preferably from 15 to 85 dry weight percent of the sheet. The dry weight percents can be calculated from the individual slurry compositions.

The sheets of the present invention are useful, for example, for mounting catalytic converters and diesel particulate filters, and as fire protection sheets or stops in buildings. Of course, the composition, thickness, and width of each of the layers may be varied to fit any contemplated end use.

Generally, the multilayer intumescent sheets of the invention have a thickness of at least 0.1 mm, preferably of at least 0.5 mm, and more preferably of at least 1 mm. Typical thicknesses of multilayer intumescent sheets of the invention for use in pollution control devices range from about 2 to about 11 mm.

Prior to being heated during use in a pollution control device, the intumescent sheets of the present invention are resilient and can be handled and flexed and wrapped around a monolith without breaking or undesirable cracking.

The multilayer sheets of the present invention also contemplate sheets comprising three or more non-moldable flexible layers which form a single sheet without auxiliary bonding means wherein at least one of the layers comprises an intumescent material.

As used herein, the phrase "without auxiliary bonding means" means without the use of bonding means such as resins, adhesives, adhesive tapes, stitches, staples, and other externally used bonding means.

As used herein, "layer" means a thickness of material having a homogeneous composition that is separately formed by first depositing and then partially dewatering a dilute slurry having a homogeneous composition. Each of the layers of the multilayer sheets of the invention may have the same or different widths and thicknesses.

As used herein, "non-moldable layer" means a layer that is made from compositions of materials containing 10 percent or less by weight solids that are wet laid using papermaking techniques.

As used herein, "intumescent material" means a material that expands, foams, or swells when exposed to a sufficient amount of thermal energy.

As used herein, "intumescent layer" means a layer of the sheet that contains an intumescent material.

As used herein, "non-intumescent layer" means a layer of the sheet that does not contain an intumescent material.

The non-moldable flexible intumescent layers of the present invention include compositions of materials that can be wet laid into flexible and resilient sheets. Generally, the non-moldable flexible intumescent layers of the invention comprise, by dry weight percent of the layer, from about 5 to about 85 percent intumescent material, and less than 20 percent organic binder. A preferred non-moldable flexible intumescent layer comprises, on a dry weight basis of the layer, from about 5 to about 85 percent intumescent material, from about 0.5 to about 15 percent organic binder, and from about 10 to about 65 percent inorganic fibers, and a more preferred non-moldable flexible intumescent layer comprises from about 5 to about 85 percent intumescent material, from about 0.5 to about 9 percent organic binder, and from about 30 to about 45 percent inorganic fibers. The non-moldable flexible intumescent layers of the invention may also contain one or more inorganic fillers, inorganic binders, organic fibers, and mixtures thereof.

Another preferred non-moldable flexible intumescent layer comprises, by dry weight percent, about 20 percent to about 65 percent unexpanded vermiculite flakes or ore, about 10 percent to about 65 percent inorganic fibers, about 0.5 percent to about 20 percent organic binders, and up to 40 percent inorganic fillers.

Another preferred non-moldable flexible intumescent layer comprises, by dry weight percent, about 20 percent to about 90 percent expandable graphite, about 10 percent to about 65 percent inorganic fibers, about 0.5 percent to about 20 percent organic binders, and up to 40 percent inorganic fillers.

Another preferred non-moldable flexible intumescent layer comprises, by dry weight percent, about 20 percent to about 90 percent expandable sodium silicate, about 10 percent to about 65 percent inorganic fiber, about 0.5 percent to about 20 percent organic binders, and up to 40 percent inorganic filler.

Another preferred non-moldable flexible intumescent layer comprises, by dry weight percent, about 20 percent to about 90 percent of a mixture of expandable graphite and either treated or untreated unexpanded vermiculite, wherein the expandable graphite is from about 5 to about 95 dry weight percent of the intumescent mixture and said unexpanded vermiculite is from about 95 to about 5 dry weight percent of the intumescent mixture, about 10 percent to about 50 percent inorganic fibers, about 0.5 percent to about 20 percent organic binders, and up to 40 percent inorganic fillers.

The choice of the intumescent materials can vary depending on the desired end use. For example, for higher temperatures, that is, above about 500° C., unexpanded vermiculite materials are suitable since they start to expand at a temperature range of from about 300° C. to about 340° C. to fill the expanding gap between an expanding metal housing and a monolith in a catalytic converter. For lower temperature use, that is, temperatures below about 500° C., such as in diesel monoliths or particulate filters, expandable graphite or a mixture of expandable graphite and unexpanded vermiculite materials may be preferred since expandable graphite starts to expand or intumesce at about 210° C. Treated vermiculites are also useful and expand at a temperature of about 290° C.

Useful intumescent materials include, but are not limited to, unexpanded vermiculite ore, treated unexpanded vermiculite ore, partially dehydrated vermiculite ore, expandable graphite, mixtures of expandable graphite with treated or untreated unexpanded vermiculite ore, processed expandable sodium silicate, for example EXPANTROL™ insoluble sodium silicate, commercially available from Minnesota Mining and Manufacturing Company, St. Paul, Minn., and mixtures thereof. For purposes of the present application, it is intended that each of the above-listed examples of intumescent materials are considered to be different and distinguishable from one another. Preferred intumescent materials include unexpanded vermiculite ore, treated unexpanded vermiculite ore, expandable graphite, and mixtures thereof. An example of a preferred commercially available expandable graphite material is GRAFOIL™ Grade 338-50 expandable graphite flake, from UCAR Carbon Co., Inc., Cleveland, Ohio.

Treated unexpanded vermiculite flakes or ore includes unexpanded vermiculite treated by processes such as by being ion exchanged with ion exchange salts such as ammonium dihydrogen phosphate, ammonium nitrate, ammonium chloride, potassium chloride, or other suitable compounds as is known in the art.

Suitable organic binder materials include aqueous polymer emulsions, solvent based polymer solutions, and polymers or polymer resins (100 percent solids). Aqueous polymer emulsions are organic binder polymers and elastomers in the latex form, for example, natural rubber lattices, styrene-butadiene lattices, butadiene-acrylonitrile lattices, ethylene vinyl acetate lattices, and lattices of acrylate and methacrylate polymers and copolymers. Polymers and polymer resins include natural rubber, styrene-butadiene rubber, and other elastomeric polymer resins. Acrylic latex and polyvinyl acetate organic binders are preferred.

Examples of preferred commercially available organic binders include RHOPLEX® HA-8 (a 45.5 percent by weight solids aqueous acrylic emulsion) from Rohm & Haas, Philadelphia, Pa. and AIRFLEX® 600BP (a 55 percent solids aqueous polyvinyl acetate emulsion) from Air Products, Allentown, Pa.

Useful inorganic fibers include for example, fiberglass, ceramic fibers, non-oxide inorganic fibers, such as graphite fibers or boron fibers, and mixtures thereof. Useful ceramic fibers include aliminoborosilicate fibers, aluminosilicate fibers, alumina fibers, and mixtures thereof.

Examples of preferred aluminoborosilicate fibers include those commercially available under the trade designations "NEXTEL" 312 and "NEXTEL" 440 from Minnesota Mining and Manufacturing Company, St. Paul, Minn. Examples of preferred aluminosilicate fibers include those available under the trade designations "FIBERFRAX" 7000M from Unifrax Corp., Niagara Falls, N.Y., "CERAFIBER" from Thermal Ceramics, Augusta, Ga.; and "SNSC Type 1260 D1" from Nippon Steel Chemical Company, Tokyo, Japan. An example of a preferred commercially available alumina fiber is SAFFIL™ fibers which are polycrystalline alumina fibers available from ICI Chemicals and Polymers, Widnes Chesire, UK.

Examples of other suitable inorganic fibers include: quartz fibers, commercially available, for example, under the trade designation "ASTROQUARTZ" from J. P. Stevens. Inc., Slater, N.C.; glass fibers, such as magnesium aluminosilicate glass fibers, for example, those commercially available under the trade designation "S2-GLASS" from Owens-Corning Fiberglass Corp., Granville, Ohio.; silicon carbide fibers, for example, those commercially available under the trade designations "NICALON" from Nippon Carbon, Tokyo, Japan, or Dow Corning, Midland, Mich., and "TYRANNO" from Textron Specialty Materials, Lowell, Mass.; silicon nitride fibers, for example, those available from Toren Energy International Corp., New York, N.Y.; small diameter metal fibers, such as BEKI-SHIELD® GR 90/C2/4 stainless steel fibers, which are commercially available from Beckaert, Zweregan, Belgium and micrometal fibers under the trade designation "RIBTEC" from Ribbon Technology Corp., Gahanna, Ohio., and mixtures thereof. Useful commercially available carbon (graphite) fibers (non-intumescent) include those under the trade designation "IM7" from Hercules Advanced Material Systems, Magna, Utah.

The non-moldable flexible intumescent layers of the present invention may also contain one or more filler materials. Filler materials may be present in the flexible intumescent layer at dry weight levels of up to about 90 percent, preferably at levels of up to about 60 percent, and more preferably at levels of up to 40 percent.

Suitable fillers and non-intumescent particles include for example, glass particles, hollow glass spheres, inert filler materials such as calcium carbonate, reinforcing and/or light weight filler materials such as mica, perlite, expanded vermiculite, processed expanded vermiculite platelets, delaminated vermiculite, endothermic filler materials such as aluminum trihydrate, magnesium phosphate hexahydrate, zinc borate, and magnesium hydroxide, and mixtures thereof.

The non-moldable flexible intumescent layers of the invention may also contain up to about 90 percent, preferably contain up to about 30 percent, and more preferably contain up to about 15 percent, by dry weight of the layer, inorganic binder. Useful inorganic binders include clay materials such as bentonite, and colloidal silicas, and mixtures thereof The non-moldable flexible intumescent layers of the invention may also contain up to about 90 percent, preferably contain up to about 10 percent, and more preferably contain up to about 3 percent, by dry weight, of organic fiber. Useful organic fibers include aramid fibers such as KEVLAR® polyamide fibers, thermo bonding fibers, for example Hoeschst Celanese HC-106 bicomponent fibers, and rayon fibers, polyolefin fibers, and mixtures thereof.

Other suitable examples of intumescent sheet materials having compositions suitable for use as a non-moldable flexible intumescent layer of the invention include those described in U.S. Pat. Nos. 3,916,057 (Hatch et al.), 4,305,992 (Langer et al.), 4,385,135 (Langer et al.), 5,254,410 (Langer et al.), 4,865,818 (Merry et al.), 5,151,253 (Merry et al.), 5,290,522 (Rogers et al.), and 5,523,059 (Langer), each of which are hereby incorporated by reference.

The multilayer flexible sheet of the present invention may also include at least one non-moldable flexible non-intumescent layer. Generally, the non-moldable flexible non-intumescent layers may contain at least one of inorganic fibers, organic binder, filler materials, organic fiber or may contain any combination thereof. Useful non-intumescent layers include combinations of inorganic fiber and organic binder, and organic binder and organic fiber.

A suitable non-moldable flexible non-intumescent layer comprises, by dry weight percent, about 10 percent to about 99.5 percent inorganic fibers, about 0.5 percent to about 20 percent organic binders, and up to 90 percent fillers. A preferred flexible non-intumescent layer comprises, by dry weight percent, from about 20 to about 99.5 percent inorganic fibers, about 0.5 to 20 percent organic binder and up to 60 percent fillers. The non-moldable flexible layer of the invention may also contain one or more organic fibers, inorganic binders, and mixtures thereof.

Inorganic fibers useful in the non-moldable flexible non-intumescent layers of the present invention include those described above such as aluminosilicate fibers, commercially available under the trademarks "FIBERFRAX" 7000M from Unifrax Co., Niagara Falls, N.Y.; "CERAFIBER" from Thermal Ceramics, Augusta, Ga.; glass fibers, zirconia-silica fibers, crystalline alumina whiskers, and microfiberglass, available from Schuller International Co., Denver, Colo.; high temperature fiberglass such as under the trade designation of "S-2 GLASS" HT from Owens-Corning, and mixtures thereof.

Organic binders useful in the non-moldable flexible non-intumescent layers of the present invention include those described above such as natural rubber lattices, poly vinylacetate, styrene-butadiene lattices, butadiene acrylonitrile lattices, and lattices of acrylate and methacrylate polymers and copolymers.

Fillers useful in the non-moldable flexible non-intumescent layers of the present invention include those described above such as expanded vermiculite, delaminated vermiculite, hollow glass microspheres, perlite, alumina trihydrate, magnesium phosphate hexahydrate, calcium carbonate, and mixtures thereof. Filler materials may be present in the flexible non-intumescent layer at dry weight levels of up to about 90 percent, preferably at levels of up to about 60 percent, and more preferably at levels of up to 40 percent.

Inorganic binders useful in the non-moldable flexible non-intumescent layers of the present invention include those described above for the non-moldable flexible intumescent layers such as bentonite and other clays. Inorganic binders may be present in the non-moldable flexible layers at levels up to about 90 percent, preferably up to about 30 percent, and more preferably, up to about 15 percent by dry weight of the layer.

Organic fibers useful in the non-moldable flexible non-intumescent layers of the present invention include those described above for the non-moldable flexible intumescent layers. Organic fibers may be present in the non-moldable flexible layers of the invention at levels up to about 90 percent, preferably up to about 10 percent, and more preferably, up to 3 percent by dry weight percent of the layer.

Other additives or process aides that may be included in any one of the layers of the invention include defoaming agents, surfactants, dispersants, wetting agents, salts to aid precipitation, fungicides, and bactericides. Generally, these types of additives are included in one or more of the layers in amounts of less than about 5 dry weight percent.

Generally, the multilayer sheets of the invention are made by making at least two dilute (preferably, not over 5 percent solids by weight) aqueous slurries containing the desired materials, depositing the first slurry onto a permeable substrate, such as a screen or a "wire" of a papermachine, partially dewatering the first slurry by gravity and/or vacuum to form a base or "lower" layer, depositing the second slurry onto the partially dewatered lower layer, partially dewatering the second or top layer, and then pressing to densify both layers with, for example, pressure rollers and then fully drying the sheet with heated rollers, to form the finished sheet. It is to be understood that either or any of the layers of the sheet of the present invention may be formed first as the lower layer of the sheet. However, the layer having the greatest thickness when dry, is preferably the layer that is formed first.

The steps of depositing and then dewatering a slurry onto a partially dewatered layer provides a partial intermingling of the components of both slurries. This intermingling permanently and effectively bonds the layers together to form a one-piece sheet where the layers may not be cleanly separated. The intermingling of the layer components may be practically invisible to the eye or may be to such an extent so as to form a visible boundary or gradient layer between the two layers. In either case, the layers are permanently bound to one another and form a single sheet with each layer being a portion of the whole sheet. Depositing a second layer slurry onto a first layer slurry as the first layer slurry is being dewatered results in a high amount of intermingling between the layers. Depositing a second layer slurry onto a partially dewatered and first-formed layer provides two distinct, but bound layers with little visible intermingling. The former is generally accomplished by depositing and then dewatering both slurries in close sequence using vacuum dewatering on an inclined wire section of a wire former. The latter is generally accomplished by depositing and vacuum forming the lower layer on the inclined section of a wire former and then depositing and dewatering the top layer by sufficient vacuum (through the lower layer) on a planar or flat portion of a wire former. The top layer should be dewatered at a sufficient rate so as to prevent undesirable settling out of the intumescent or other higher density filler materials. A sufficient dewatering rate will provide layers having homogeneous compositions outside of the "intermingled" or "gradient" layer.

Generally, when making the slurries, the higher density materials such as the intumescent materials and higher density fillers (if used) are added to the slurries in a smaller volume mixing vessel at a constant rate just prior to the depositing step. The slurries containing the fillers and intumescent materials are agitated sufficiently so to prevent these particles from settling out in the mixing tank prior to forming the individual layers. Such slurries should be partially dewatered almost immediately after being deposited on the wire so to prevent undesirable settling of the higher density particles. Vacuum dewatering of the slurries is preferred.

After the partially dewatered multilayered sheet is formed, the sheet is dried to form an end-use product. Useful drying means include wet pressing the sheet material through compression or pressure rollers followed by passing the sheet material through heated rollers and forced hot air drying as is known in the art.

The multilayer sheets of the invention may be made using fourdrinier machines having both an inclined and a flat wire section and a second headbox in addition to the headbox ordinarily furnished with such machines. The multilayer sheets of the invention may also be made on any commercially available inclined wire former designed to make multi-ply sheets, for example, a DOUMAT™ DELTAFORMER™ from Sandy Hill Corp., Hudson Falls, N.Y. A preferred fourdrinier machine has both an inclined screen area and a subsequent flat or horizontal screened area where the "second" layer may be deposited from a second headbox onto the lower layer and then dewatered using vacuum.

Additionally, the multilayer sheets of the invention can further include edge protection materials. Suitable materials include a stainless steel wire screen wrapped around the edges as described in U.S. Pat. No. 5,008,086 (Merry), incorporated herein by reference, and braided or rope-like ceramic (that is, glass, crystalline ceramic, or glass-ceramic) fiber braiding or metal wire material as described in U.S. Pat. No. 4,156,533 (Close et al.), incorporated herein by reference. Edge protectants can also be formed from compositions having glass particles as described in EP 639 701 A1 (Howorth et al.), EP 639 702 A1 (Howorth et al.), and EP 639 700 A1 (Stroom et al.), all of which are incorporated herein by reference.

In another aspect, the invention provides a pollution control device, for example, a catalytic converter or a diesel particulate filter, using a multilayer sheet of the invention. A catalytic converter or diesel particulate filter of the invention comprises a housing, a monolithic structure or element(s), and a multilayer sheet comprising (a) at least one non-moldable flexible layer that may be non-intumescent or intumescent; and (b) at least one non-moldable flexible intumescent layer comprising an intumescent material, said layers forming a single sheet without the use of auxiliary bonding means, said multilayer sheet being disposed between the structure and the housing to hold the structure in place.

An example of a multilayer sheet suitable for use in a catalytic converter comprises a non-moldable flexible non-intumescent layer comprising ceramic fiber and organic binder, and a non-moldable flexible intumescent layer comprising unexpanded vermiculite, ceramic fiber, and organic binder.

An example of a multilayer sheet suitable for use in a diesel particulate filter comprises a first non-moldable flexible intumescent layer comprising ceramic fiber, unexpanded vermiculite, and organic binder, and a second non-moldable flexible intumescent layer comprising ceramic fiber, expandable graphite, and organic binder.

The housing, which is also referred to as a can or a casing, can be made from suitable materials known in the art for such use and is typically made of metal. Preferably, the housing is made of stainless steel.

Suitable catalytic converter elements, also referred to a monoliths, are known in the art and include those made of metal or ceramic. The monoliths or elements are used to support the catalyst materials for the converter. A useful catalytic converter element is disclosed, for example, in U.S. Pat. No. RE 27,747 (Johnson).

Ceramic catalytic converter elements are commercially available, for example, from Corning Inc., Corning, N.Y., and NGK Insulator Ltd., Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Co., Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (for example, metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

Useful monolithic type diesel particulate filter elements are typically wall flow filters comprised of honeycombed, porous, crystalline ceramic (for example, cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Usefull diesel particulate filter elements are commercially available, for example, from Corning Inc., Corning, N.Y., and NGK Insulator Ltd., Nagoya, Japan. Useful diesel particulate filter elements are discussed in "Cellular Ceramic Diesel Particulate Filter," Howitt et al., Paper No. 810114, SAE Technical Paper Series, 1981.

In use, a multilayer sheet of the invention is disposed between the monolith and the housing in similar fashion for either a catalytic converter or for a diesel particulate filter. This may be done by wrapping the monolith with a multilayer sheet of the invention, inserting the wrapped monolith into the housing, and sealing the housing. The intumescent multilayer sheet holds the monolith in place within the housing and seals the gap between the monolith and the housing to prevent exhaust gases from bypassing the monolith.

The orientation of the multilayer sheet between the housing and the monolith is dependent on the compositions of the layers of the sheet. For example, the intumescent layer of a sheet of the invention containing an intumescent material such as expandable graphite would advantageously be placed adjacent to a diesel monolith. This is because diesel particulate filters are typically heated to temperatures below about 500° C. and expandable graphite starts to expand at a temperature of about 210° C.

In another aspect, the invention provides a multilayer sheet material useful as a firestop for limiting the spread of fire through openings in the walls, floors, and ceilings of structures.

An example of a multilayer intumescent sheet useful as a firestop comprises a first non-moldable flexible intumescent layer comprising unexpanded vermiculite, organic binder and alumina trihydrate, and a second non-moldable flexible intumescent layer comprising expandable graphite, organic binder, and aluminum trihydrate wherein said layers form a single sheet without the use of auxiliary bonding means.

An example of a preferred multilayer sheet material for use as a firestop comprises a non-moldable flexible layer comprising alumina trihydrate as described in U.S. Pat. No. 4,600,634, incorporated by reference herein, and a non-moldable flexible intumescent layer comprising an intumescent material, wherein said layers form a single sheet without the use of auxiliary bonding means.

In use, a multilayer sheet of the invention useful as a firestop is preferably oriented such that the layer containing the intumescent material faces toward the side most likely to get hot.

The present invention also contemplates intumescent sheets having three or more layers wherein at least one layer comprises an intumescent material and wherein adjacent layers are preferably comprised of different compositions.

EXAMPLES

Test Methods
Real Conditions Fixture Test (RCFT)

The RCFT is a test used to measure the pressure exerted by the mounting material under conditions representative of actual conditions found in a catalytic converter during normal use.

Two 50.8 mm by 50.8 mm heated platens, controlled independently, are heated to different temperatures to simulate the metal housing and monolith temperatures, respectively. Simultaneously, the space of gap between the platens increased by a value calculated from the temperature and the thermal expansion coefficients of a typical catalytic converter. The temperatures of the platen and the gap are presented in Table 1 below. The force exerted by the mounting material is measured by a Sintech ID computer-controlled load frame with an Extensometer available from MTS Systems Corp., Research Triangle Park, N.C.

TABLE 1

| Monolith Temperature (C.) | Shell Temperature (C.) | Gap Change (cm) |
| --- | --- | --- |
| 25 | 25 | 0.0000 |
| 63 | 30 | 0.0001 |
| 100 | 35 | 0.0003 |
| 150 | 40 | 0.0003 |
| 200 | 55 | 0.0012 |
| 200 | 120 | 0.0068 |
| 200 (soak) | 120 | 0.0068 |
| 150 | 90 | 0.0046 |
| 100 | 60 | 0.0024 |
| 63 | 42 | 0.012 |
| 25 | 25 | 0.000 |

The above conditions model a 12.7 cm. diameter ceramic monolith with a 409 stainsteel steel and is representative of the conditions found in a diesel catalytic converter.

Thickness Measurement

The thickness of the flexible non-moldable sheets is measured by placing a 2 ½ inch (6.35 centimeter) diameter deadweight exerting 0.7 psi (4.8 kPa) upon the sheet and measuring the compressed thickness.

EXAMPLES

The examples described below were made on a fourdrinier papermaking machine having an inclined wire section and a subsequent flat wire section. The inclined wire section was inclined at an angle of 23 degrees from horizontal. A first headbox was mounted on the inclined wire section. A second headbox was mounted either on the inclined wire section in the slurry pond of the first headbox or on the flat wire section. The headboxes provide a slurry pond zone wherein the flow rate of the slurry onto the moving wire can be controlled. Vacuum sources or boxes were placed below and slightly in front of each headbox for dewatering the slurries when they were deposited onto the wire section. To prevent undesirable settling out of relatively dense filler and intumescent particles during the deposition of the slurries onto the wire, the vacuum boxes were placed in close proximity to the headboxes such that dewatering of the slurries coincided with the deposition of the slurries on the wire. The fourdrinier machine was connected via a conveyer belt to a conventional wet pressing roll and a series of conventional steam-heated drying rolls and finally to a conventional winding roll. Conventional pumps were used to pump the slurries to each of the headboxes and the pump rates were controlled using flow controllers.

Examples 1–5

One-hundred pounds (45.4 kg) of ceramic fibers (FIBERFRAX™ 7000M, available from Unifrax Co., Niagara Falls, N.Y.) were slushed in 960 gallons (3,634 L) of water in a Mordon Slush-Maker for one minute. The fiber slush was transferred to a 2000 gallon (7,520 L) chest and diluted with an additional 140 gallons (526 L) of water. Thirty-nine pounds (17.7 kg) of 45.5 percent solids latex (RHOPLEX® HA-8, available from ROHM & HAAS, Philadelphia, Pa.) was added while mixing. Eleven pounds (5.0 kg) of aluminum sulfate (50 percent solids) was then added to coagulate the latex. This latex-fiber slurry is hereafter referred to as formula "A".

A second slurry was prepared by slushing 100 pounds (45.4 kg) of ceramic fibers (FIBERFRAX™ 7000M) in 960 gallons (3,634 L) of water and mixing for one minute. Forty-three pounds (19.5 kg) of expanded vermiculite (ZONOLITE® #5, available from W. R. Grace Co., Cambridge, Mass.) were added to the slushed fibers and mixed until dispersed. The fiber-expanded vermiculite slurry was pumped to a 1500 gallon (5,678 L) chest and diluted with an additional 140 gallons (526 L) of water. Thirty-nine pounds (17.7 kg) of latex (RHOPLEX® HA-8, 45.5 percent solids) was added while mixing and 11 pounds (5.0 kg) of alum (50 percent solids) was added to coagulate the latex. This slurry is hereafter referred to as formula "B".

The formula A and B slurries were metered to separate 50 gallon (189 L) mixing tanks where unexpanded vermiculite having a mesh size of between 20 and 50 mesh, referred to as "V" below, and expandable graphite (GRAFOIL® Grade 338-50 expandable graphite flake, available from UCAR Carbon Co., Inc., Cleveland, Ohio.), referred to as "G" below, were metered and mixed into the "A" and/or "B" slurries at a sufficient rate to maintain a substantially constant concentration. The slurries containing the intumescent materials were under continuous agitation using a 3-bladed propeller rotating at sufficient speed to keep the intumescent material suspended within the slurry. The slurries and particles were metered at variable rates and directed to either the top or bottom layer headboxes to make multi-layer sheets having the desired dry weight compositions and thicknesses. The slurry contained in the bottom layer headbox was kept under continuous agitation using a horizontal rotating mixing roll. Both headboxes were mounted on the inclined section of the wire as described above. The wire speed was maintained at about 2 feet/min (0.61 m/min) and the A and B slurries were pumped to the respective headboxes at a rate of about 5 gal/min (18.9 L/min) to achieve the desired layer basis weight and thickness. Sufficient vacuum was applied to the slurries to obtain formed and dewatered layers. The dewatered multilayer sheets were then wet pressed through rollers, dried using drying rollers, and then wound on a winding stand to form a continuous roll. The total sheet thickness, sheet and layer basis weights, and dry weight percentages of V and G in each layer of Examples 1–5 are shown in Table 2 below.

Example 6

Seventy-five pounds (34.1 kg.) of ceramic fibers (FIBERFRAX™ 7000M) were slushed in 400 gallons (1514 L) of water in a Mordon Slush-Maker for 90 seconds then transferred to a 2000 gallon (7570 L) chest. Another 75 pounds (34.1 kg) of ceramic fibers (FIBERFRAX™ 7000M) were slushed as described above and added to the 2000 gallon (7570 L) chest and the combined batches were diluted with 250 gallons (946 L) of rinse water. Twenty-two pounds (10 kg.) of latex (AIRFLEX™ 600BP, 55 percent solids), 3.3 pounds (1.5 kg.) liquid sodium aluminate (NALCO™ 2372, from Nalco Chemical, Naperville, Ill.), and 3.1 ounces (0.09 liters) of defoamer (FOAMASTER™III, from Henkel Co., Edison, N.J.) were then added to the chest while mixing. After 2 to 3 minutes, the pH of the mixture was measured at 5.6. Then, 23 pounds (10.4 kg) of aluminum sulfate (50 percent solids) was diluted with and equivalent volume of water and slowly added to the chest while mixing to form a slurry. This slurry is hereafter referred to as formula "C".

Two-hundred gallons (757 L) of formula "C" slurry was then pumped into a 1500 gallon (5678 L) chest and diluted with an additional 200 gallons (757 L) of water. Fifty gallons (189 L) of this slurry was drained from the chest. The resultant slurry is hereafter referred to as formula "D." Fifty pounds (22.7 kg) of expandable graphite (G) (GRAFOIL™ Grade 338-50 expandable graphite flake) was added to the formula "D" slurry while mixing. At this time, 3.4 ounces (0.1 L) of red dye (GRAPHTOL™ Red pigment dispersion, from Sandoz Colors and Chemicals East Hanover, N.J.) was added to the formula "C" slurry in the 2000 gallon (7570 L) chest containing base stock. Continuous mixing in addition to recirculation of the slurries by pumping from a bottom outlet through a 2 inch (5.1 centimeter) hose was maintained at a rate sufficient to keep all solids suspended in both chests.

Formula "C" slurry was then metered and delivered to a mix tank of 50 gallon (189 L) capacity at a rate sufficient to maintain the desired base web basis weight. Unexpanded vermiculite (V) was added to the mixing tank at a rate sufficient to maintain the desired proportion of vermiculite in the bottom layer of the sheet. These proportions were obtained by first measuring the basis weight of the layer formed without vermiculite and then adjusting the formula "C" slurry flow to the mix tank before metering unexpanded vermiculite into the mix tank, and then adjusting the rate of addition of the unexpanded vermiculite to obtain the desired basis weight of the resulting bottom layer.

The formula "C"+V slurry from the mix tank was fed by gravity to the first headbox mounted on the inclined wire section of the above described fourdrinier machine to form a 12 inch (30.5 cm) wide layer at a wire speed of 26.4 inches (67.1 cm) per minute. The formula "D"+G slurry was delivered to the second headbox mounted on the flat wire section of the fourdrinier machine. Sufficient vacuum was maintained through the lower layer at the point where the formula "D"+G slurry was delivered so to partially dewater the slurry to form a non-moldable flexible layer having about 70 percent expandable graphite by weight. Example 6 is described in Table 2 below.

TABLE 2

| EXAMPLE | LAYER | FORMULA[1] | BASIS WEIGHT[2] (g/m²) | THICKNESS[3] (mm) |
|---|---|---|---|---|
| 1 | Top | B + 10% V | 752 | |
| | Bottom | A | 1152 | |
| | | | (1904) | (7.0) |
| 2 | Top | B + 10% V | 752 | |
| | Bottom | A + 54% V | 2477 | |
| | | | (3229) | (7.3) |
| 3 | Top | A | 1108 | |
| | Bottom | A + 54% V | 2477 | |
| | | | (3229) | (7.6) |
| 4 | Top | A + 61% G | 900 | |
| | Bottom | A + 54% V | 2477 | |
| | | | (3377) | (5.3) |
| 5 | Top | A + 61% G | 1290 | |
| | Bottom | A + 54% V | 2477 | |
| | | | (3767) | (6.7) |
| 6 | Top | D + 70% G | 560 | |
| | Bottom | C + 37% V | 2390 | |
| | | | (2950) | (6.1) |

[1]·V = unexpanded vermiculite; G = expandable graphite; (%) = percent by dry weight in the layer.
[2]·The total basis weight of both layers is shown in parentheses.
[3]·The total thickness of both layers is shown in parentheses.

All of the above multilayer sheets were flexible and resilient and the layers were bonded together such that the layers could not be cleanly separated at the boundary between the layers. Each of the multilayer sheet examples could be handled without breaking or undesirable cracking. The above examples also demonstrate that such flexible and resilient multilayer sheets may be made using a continuous process that is less expensive and more efficient when compared with a process wherein multiple layers are bonded together using an adhesive or other auxiliary bonding means.

Example 7

Example 6 described above and Comparative Example 1, described below, were tested and compared for holding strength under the Real Condition Fixture Test (RCFT) described above. The temperatures used in the RCFT are representative of those found in a diesel catalytic converter. Comparative Example 1 (C1) was a 4070 gram per square meter (nominal) single layer, low temperature intumescent ceramic fiber sheet containing unexpanded vermiculite, commercially available under the trademark "INTERAM" TYPE 200 from Minnesota Mining cturing Company, St. Paul, Minn. The starting mount densities for Example 6 and C1 were 0.9 and 1.0 grams per cubic centimeter respectively.

The results of the RCFT for Example 6 and C1 are shown in Table 3 below. The results of the test show that the multilayer sheet of the invention provides higher pressures or holding force over the temperature range than the sheet of Compartive Example 1.

TABLE 3

| Monolith Temperature (C.) | Shell Temperature (C.) | Gap Change (cm) | Example 6 Pressure (kPa) | Comparative 1 (C1) Pressure (kPa) |
|---|---|---|---|---|
| 25 | 25 | 0.0000 | 291.5 | 215.6 |
| 63 | 30 | 0.0001 | 231.2 | 162.1 |
| 100 | 35 | 0.0003 | 228.0 | 160.9 |
| 150 | 40 | 0.0003 | 223.1 | 152.5 |
| 200 | 55 | 0.0012 | 155.8 | 94.3 |
| 200 | 120 | 0.0068 | 101.1 | 57.8 |
| 200 (soak) | 120 | 0.0068 | 117.2 | 47.8 |
| 150 | 90 | 0.0046 | 115.5 | 49.9 |
| 100 | 60 | 0.0024 | 130.1 | 57.9 |
| 63 | 42 | 0.0012 | 140.4 | 65.4 |
| 25 | 25 | 0.0000 | 146.2 | 76.1 |

Example 8

A multilayer sheet containing a mixture of unexpanded vermiculite and expandable graphite in the top layer and unexpanded vermiculite in the bottom layer was made as described above for Examples 1–5. Example 8 is described below in Table 4.

TABLE 4

| EXAMPLE | LAYER | FORMULA[1] | BASIS WEIGHT[2] (g/m$^2$) | THICKNESS[3] (mm) |
|---|---|---|---|---|
| 8 | Top | A + 33% V + 22% G | 526 | |
|   | Bottom | A + 55% V | 2733 (3259) | (5.3) |

[1] V = unexpanded vermiculite; G = expandable graphite; (%) = percent by dry weight in the layer.
[2] The total basis weight of both layers is shown in parentheses.
[3] The total thickness of both layers is shown in parentheses.

The multilayer intumescent sheet of Example 8 was flexible and could be handled without breaking or undesirable cracking. The multilayer sheet of Example 8 also could not be cleanly separated at the boundary between the layers.

Example 9

Example 8 described above and Comparative Example 2, described below, were tested and compared for holding strength under a RCFT using the temperature profile described below in Table 5. The temperature profile of the RCFT shown in Table 5 is representative of conditions found within an automotive catalytic converter. Comparative Example (C2) was a 3100 gram per square meter (nominal) single layer, intumescent ceramic fiber sheet containing unexpanded treated vermiculite and is commercially available under the trademark "INTERAM" TYPE 100 from Minnesota Mining and Manufacturing Company, St. Paul, Minn. The starting mount density for Example 8 and C2 was 1.0 grams per cubic centimeter.

The results of the RCFT for Example 7 and C2 are shown in Table 5 below. The results of the test show that the intumescent multilayer sheet of Example 8 provides higher pressures or holding force over the temperature range and provides a lower pressure drop at low temperatures (25–400° C.) than the intumescent sheet of Comparative Example 2.

TABLE 5

| Monolith Temperature (C.) | Shell Temperature (C.) | Gap Change (cm) | Example 8 Pressure (kPa) | Comparative 2 (C2) Pressure (kPa) |
|---|---|---|---|---|
| 25 | 25 | 0.0003 | 310 | 183 |
| 100 | 25 | 0.0003 | 259 | 101 |
| 150 | 30 | 0.0003 | 251 | 93 |
| 200 | 35 | 0.0003 | 226 | 80 |
| 250 | 38 | 0.0003 | 220 | 70 |
| 300 | 40 | 0.0003 | 246 | 65 |
| 350 | 45 | 0.0003 | 330 | 80 |
| 400 | 50 | 0.0003 | 434 | 123 |
| 450 | 60 | 0.0003 | 370 | 142 |
| 500 | 70 | 0.0003 | 380 | 184 |
| 550 | 85 | 0.0013 | 393 | 227 |
| 600 | 100 | 0.0025 | 448 | 282 |
| 650 | 125 | 0.0038 | 540 | 357 |
| 700 | 150 | 0.0051 | 640 | 442 |
| 750 | 185 | 0.0076 | 713 | 526 |
| 800 | 220 | 0.0102 | 787 | 626 |
| 850 | 325 | 0.0165 | 1021 | 853 |
| 900 | 430 | 0.0229 | 1251 | 1022 |
| 900 | 480 | 0.0267 | 1184 | 983 |
| 900 | 530 | 0.0305 | 1152 | 959 |
| 900 (soak) | 530 | 0.0305 | 944 | 869 |
| 850 | 502 | 0.0292 | 914 | 804 |
| 800 | 474 | 0.0279 | 869 | 800 |
| 750 | 445 | 0.0254 | 903 | 829 |
| 700 | 416 | 0.0229 | 940 | 904 |
| 650 | 387 | 0.0216 | 889 | 808 |
| 600 | 358 | 0.0203 | 830 | 770 |
| 550 | 329 | 0.0191 | 788 | 737 |
| 500 | 300 | 0.0178 | 682 | 635 |
| 450 | 275 | 0.0165 | 640 | 619 |
| 400 | 250 | 0.0152 | 529 | 475 |
| 350 | 215 | 0.0127 | 418 | 432 |
| 300 | 180 | 0.0102 | 289 | 306 |
| 250 | 155 | 0.0089 | 162 | 173 |
| 200 | 130 | 0.0076 | 76 | 96 |
| 150 | 95 | 0.0051 | 56 | 83 |
| 100 | 60 | 0.0025 | 68 | 83 |
| 50 | 50 | 0.0003 | 88 | 108 |

Equivalents

It will be apparent to those skilled in the art that various modifications and variations can be made in the articles and method of the present invention without departing from the spirit or scope of the invention. It should be understood that this invention is not intended to be unduly limited by the illustrative embodiments and examples set forth herein and that such examples and embodiments are presented by way of example only with the scope of the invention to be limited only by the claims set forth herein as follows.

What is claimed is:

1. A pollution control device comprising:

(A) a housing;

(B) a pollution control element disposed within the housing; and (C) a flexible intumesent sheet disposed between the housing and the element, said sheet comprising:

(a) a first non-moldable flexible intumescent layer comprising a first intumescent material wherein said first intumescent material is unexpanded vermiculite ore, unexpanded treated vermiculite ore, partially dehydrated vermiculite ore, expanded graphite, expandable sodium silicate, or mixtures thereof; and (b) a second non-moldable flexible intumescent layer comprising a second intumescent material wherein said second intumescent material is unexpanded vermiculite ore, unexpanded treated vermiculite ore, partially dehydrated vermiculite ore, expanded graphite, expandable sodium silicate, or mixtures thereof, said first intumescent material and said second intumescent material being different, and said layers forming a single sheet without the use of auxiliary bonding means.

2. The pollution control device of claim 1, wherein the at least two intumescent materials of the intumescent mixture in the first non-moldable flexilbe intumescent layer are unexpanded vermiculite ore and expandable graphite and the intumescent material in the second non-moldable intumescent layer is unexpanded vermiculite ore, unexpanded treated vermiculite ore, or mixtures thereof.

3. The pollution control device of claim 2 wherein the first non-moldable flexible intumescent layer contains from about 20 to about 90 percent of said intumescent mixture, wherein said mixture contains from 5 to about 95 dry weight percent unexpanded vermiculite ore and from about 95 to about 5 dry weight percent expandable graphite, based on the weight of the intumescent mixture and the intumescent material in the second intumescent layer is present in an amount of from about 10 to about 65 dry weight percent.

4. A pollution control device comprising:
 (a) a housing;
 (b) a pollution control disposed within the housing; and
 (c) a flexible intumescent multilayer sheet disposed between the housing and the element, said sheet comprising:
  (A) a first non-moldable flexible intumescent layer comprising unexpanded vermiculite ore; and
  (B) a second non-moldable flexible intumescent layer comprising an intumescent wherein said intumescent material is unexpanded treated vermiculite ore, partially dehydrated vermiculite ore, expandable graphite, expandable sodium silicate, or mixtures thereof, said layers forming a single sheet without the use of auxiliary bonding means.

5. The pollution control device of claim 4 wherei the first and the second intumescent layers further comprise inorganic fiber and organci binder.

6. The pollution control device of claim 5 wherein the first non-moldable flexible intumescent layer comprises, on a dry weight basis, from about 20 percent to about 65 percent partially dehydrated vermiculite ore, about 10 percent to about 65 percent inorganic fiber, and about 0.3 percent to about 20 percent organic binder, and the second non-moldable flexible intumescent layer comprises, by dry weight percent, from about 5 to about 85 percent intumescent material, from about 0.5 to about 15 percent organic binder and from about 10 to about 65 percent inorganic fiber.

7. The pollution control device of claim 5 wherein the first non-moldable flexible intumescent layer comprises, on a dry weight basis, from about 20 percent to about 65 percent unexpanded treated vermiculite ore, about 10 percent to about 65 percent inorganic fiber, and about 0.5 percent to about 20 percent organic binder, and the second non-moldable flexible intumescent layer comprises, by dry weight percent, from about 5 to about 85 percent intumescent material, from about 0.5 to about 15 percent organic binder and from about 10 to about 65 percent inorganic fiber.

8. A pollution control device comprising:
 (a) a housing;
 (b) a pollution control element disposed within the housing; and
 (c) a flexible intumescent multilayer sheet disposed between the housing and the element, said sheet comprising:
  (A) a first non-moldable flexible intumescent layer comprising partially unexpanded treated vermiculite ore; and
  (B) a second non-moldable flexible intumescent layer comprising an itumescent material wherein said intumescent material is unexpanded vermiculite ore, partially dehydrated vermiculite ore, expandable graphite, expandable sodium silicate, or mixtures thereof, said layers forming a single sheet without the use of auxiliary bonding means.

9. The pollution control device of claim 8 wherein the first and the second intumescent layers further comprise inorganic fiber and organic binder.

10. The pollution control device of claim 9 wherein the first non-moldable flexible intumescent layer comprises, on a dry weight basis, from about 20 percent to about 65 percent partially dehydrated vermiculite ore, about 10 percent to about 65 percent inorganic fiber, and about 0.5 percent to about 20 percent organic binder, and the second non-moldable flexible intumescent layer comprises, by dry weight percent, from about 5 to about 85 percent intumescent material, from about 0.5 to about 15 percent organic binder and from about 10 to about 65 percent inorganic fiber.

11. A pollution control device comprising:
 (a) a housing;
 (b) a pollution control element disposed within the housing; and
 (c) a flexible intumescent multilayer sheet disposed between the housing and the element, said sheet comprising:
  (A) a first non-moldable flexible intumescent layer comprising partially dehydrated vermiculite ore; and
  (B) a second non-moldable flexible intumescent layer comprising an intumescent material wherein said intumescent material is unexpanded vermiculite ore, unexpanded treated vermiculite ore, expandable graphite, expandable sodium silicate, or mixtures thereof, said layers forming a single sheet without the use of auxiliary bonding means.

12. The pollution control device of claim 11 wherein the first and the second intumescent layers further comprise inorganic fiber and organic binder.

13. The pollution control device of claim 12 wherein the first non-moldable flexible intumescent layer comprises, on a dry weight basis, from about 20 percent to about 90 percent expandable graphite, about 10 percent to about 65 percent inorganic fiber, and about 0.5 percent to about 20 percent organic binder, and the second non-moldable flexible intumescent layer comprises, by dry weight percent, from about 5 to about 85 percent intumescent material, from about 0.5 to about 15 percent organic binder and from about 10 to about 65 percent inorganic fiber.

14. A pollution control device comprising:
 (a) a housing;
 (b) a pollution control element disposed within the housing; and
 (c) a flexible intumescent multilayer sheet disposed between the housing and the element, said sheet comprising:
  (A) a first non-moldable flexible intumescent layer comprising expandable graphite; and
  (B) a second non-moldable flexible intumescent layer comprising an intumescent material wherein said intumescent material is unexpanded vermiculite ore, unexpanded treated vermiculite ore, partially dehydrated vermiculite ore, expandable sodium silicate, or mixtures thereof, said layers forming a single sheet without the use of auxiliary bonding means.

15. The pollution control device of claim 14 wherein the first and the second intumescent layers further comprise inorganic fiber and organic binder.

16. The pollution control device of claim 15 wherein the first non-moldable flexible intumescent layer comprises, on a dry weight basis, from about 20 percent to about 90 percent expandable sodium silicate, about 10 percent to about 65 percent inorganic fiber, and about 0.5 percent to about 20 percent organic binder, and the second non-moldable flexible intumescent layer comprises, by dry weight percent, from about 5 to about 85 percent intumescent material, from about 0.5 to about 15 percent organic binder and from about 10 to about 65 percent inorganic fiber.

17. A pollution control device comprising:
(a) a housing;
(b) a pollution control element disposed within the housing; and
(c) a flexible intumescent multilayer sheet disposed between the housing and the element, said sheet comprising:
(A) a first non-moldable flexible intumescent layer comprising expandable sodium silicate; and
(B) a second non-moldable flexible intumescent layer comprising an intumescent material wherein said intumescent material is unexpanded vermiculite ore, unexpanded treated vermiculite ore, partially dehydrated vermiculite ore, expandable graphite, or mixtures thereof, said layers forming a single sheet without the use of auxiliary bonding means.

18. The pollution control device of claim 17 wherein the first and second intumescent layers further comprise inorganic fiber and organic binder.

19. The pollution control device of claim 18 wherein the first non-moldable flexible intumescent layer comprises, on a dry basis, from about 20 percent to about 90 percent expandable sodium silicate, about 10 percent to about 65 percent inorganic fiber, and about 0.5 percent to about 20 percent organic binder, and the second non-moldable flexible intumescent layer comprises, by dry weight percent, from about 5 to about 85 percent intumescent material, from about 0.5 to about 15 percent organic binder and from about 10 to about 65 percent inorganic fiber.

20. A pollution control device comprising:
(A) a housing;
(B) a pollution control element disposed within the housing; and
(C) a flexible intumescent multilayer sheet disposed between the housing and the element, said sheet comprising:
(a) a first non-moldable flexible intumescent layer comprising a first intumescent material wherein said intumescent material is unexpanded vermiculite ore, unexpanded treated vermiculite ore, partially dehydrated vermiculite ore, expanded graphite, expandable sodium silicate, or mixtures thereof; and
(b) a second non-moldable flexible intumescent layer comprising a second intumescent material wherein said second intumescent material is unexpanded vermiculite ore, unexpanded treated vermiculite ore, partially dehydrated vermiculite ore, expanded graphite, expandable sodium silicate, or mixtures thereof, said first intumescent material and said second intumescent material being different, and said layers forming a single sheet without the use of auxiliary bonding means.

21. A firestop comprising:
(a) a first non-moldable flexible intumescent layer comprising a first intumescent material wherein said intumescent material is unexpanded vermiculite ore, unexpanded treated vermiculite ore, partially dehydrated vermiculite ore, expanded graphite, expandable sodium silicate, or mixtures thereof; and
(b) a second non-moldable flexible intumescent layer comprising a second intumescent material wherein said second intumescent material is unexpanded vermiculite ore, unexpanded treated vermiculite ore, partially dehydrated vermiculite ore, expanded graphite, expandable sodium silicate, or mixtures thereof, said first intumescent material and said second intumescent material being different, and said layers forming a single sheet without the use of auxiliary bonding means.

* * * * *

UNITED STATES PATENT AND TRADEMARK OFFICE
CERTIFICATE OF CORRECTION

PATENT NO. : 6,051,193
DATED : April 18, 2000
INVENTOR(S) : Roger L. Langer et al.

It is certified that error appears in the above-identified patent and that said Letters Patent is hereby corrected as shown below:

Column 10,
Line 33, "Usefull" should read -- Useful --.

Column 14,
Line 38, "Mining cturing" should read -- Mining and Manufacturing --.

Signed and Sealed this

Sixteenth Day of October, 2001

Attest:

*Nicholas P. Godici*

NICHOLAS P. GODICI
*Attesting Officer*  *Acting Director of the United States Patent and Trademark Office*